United States Patent
Appel et al.

(10) Patent No.: US 11,137,764 B2
(45) Date of Patent: Oct. 5, 2021

(54) RECHARGING FOR AUTONOMOUS IN-PIPE VEHICLES

(71) Applicant: International Business Machines Corporation, Armonk, NY (US)

(72) Inventors: Ana Paula Appel, São Paulo (BR); Stefany Mazon, São Paulo (BR); Vagner Figueredo de Santana, São Paulo (BR); Ricardo Luis Ohta, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 242 days.

(21) Appl. No.: 16/383,831

(22) Filed: Apr. 15, 2019

(65) Prior Publication Data

US 2020/0326705 A1 Oct. 15, 2020

(51) Int. Cl.
*G05D 1/00* (2006.01)
*B08B 9/051* (2006.01)
*G06N 5/04* (2006.01)
*F16L 101/30* (2006.01)

(52) U.S. Cl.
CPC .......... *G05D 1/0088* (2013.01); *B08B 9/051* (2013.01); *G06N 5/04* (2013.01); *F16L 2101/30* (2013.01); *G05D 2201/0207* (2013.01)

(58) Field of Classification Search
CPC .......... G05D 1/0088; G05D 2201/0207; B08B 9/051; B08B 9/049; F16L 2101/30; F16L 55/28; F16L 55/32
See application file for complete search history.

(56) References Cited

U.S. PATENT DOCUMENTS

| | | | |
|---|---|---|---|
| 6,108,597 A | 8/2000 | Kirchner et al. | |
| 7,210,364 B2 | 5/2007 | Ghorbel et al. | |
| 7,303,010 B2* | 12/2007 | de Guzman | F16L 55/32 166/250.01 |
| 7,474,955 B2 | 1/2009 | Wittefeldt et al. | |
| 8,024,066 B2 | 9/2011 | Reverte et al. | |
| 8,170,715 B1* | 5/2012 | Vallapuzha | B08B 9/0436 700/245 |
| 8,525,124 B2 | 9/2013 | Atwood et al. | |
| 9,728,817 B2 | 8/2017 | Comello et al. | |

(Continued)

FOREIGN PATENT DOCUMENTS

| | | |
|---|---|---|
| CN | 102681544 A | 9/2012 |
| CN | 206568169 U | 10/2017 |

(Continued)

OTHER PUBLICATIONS

Deep Trekker, Underwater Inspections Made Easy, 2019.

(Continued)

*Primary Examiner* — Michael J Zanelli
(74) *Attorney, Agent, or Firm* — Garg Law Firm, PLLC; Rakesh Garg; Joseph Petrokaitis

(57) ABSTRACT

A rechargeable power source in an autonomous vehicle (AV) adapted to traverse within a pipe network is charged, the charging using mechanical power derived from a flow of material within the pipe network. A sensor in the AV is powered from the charged rechargeable power source. Using power from the rechargeable power source, the AV is caused to traverse within the pipe network.

18 Claims, 14 Drawing Sheets

(56) References Cited

U.S. PATENT DOCUMENTS

| | | | |
|---|---|---|---|
| 2006/0074525 A1* | 4/2006 | Close | B25J 9/1617 |
| | | | 700/245 |
| 2006/0290779 A1* | 12/2006 | Reverte | E03F 7/10 |
| | | | 348/84 |
| 2011/0282591 A1* | 11/2011 | Cogen | G01C 21/16 |
| | | | 702/36 |
| 2018/0088099 A1 | 3/2018 | Starr et al. | |
| 2018/0120811 A1* | 5/2018 | Randhawa | F16L 55/40 |
| 2018/0313715 A1* | 11/2018 | Cichosz | G01M 3/40 |

FOREIGN PATENT DOCUMENTS

| | | |
|---|---|---|
| CN | 101887271 A | 8/2018 |
| KR | 20070027430 A | 3/2007 |
| KR | 101007862 B1 | 1/2011 |
| KR | 101118269 B1 | 3/2012 |
| KR | 101225999 B1 | 1/2013 |
| KR | 101244361 B1 | 3/2013 |
| WO | 2012141468 A4 | 10/2012 |

OTHER PUBLICATIONS

Jack Loughran, Water leaks discovered with drones and camera sensing technology, Mar. 20, 2018.
Water Lily, Recharge with nature, 2019.
Ryan Whitwam, MIT Develops Water-to-Air Wireless Communication, Aug. 21, 2018.
Texas Instruments, Using ultrasonic technology for flow measurement, 2017.

\* cited by examiner

RECHARGING FOR AUTONOMOUS IN-PIPE VEHICLES

TECHNICAL FIELD

The present invention relates generally to a method, system, and computer program product for management of autonomous in-pipe vehicles. More particularly, the present invention relates to a method, system, and computer program product for route modification and recharging for autonomous in-pipe vehicles.

BACKGROUND

A pipe network transports a liquid or gas material from one location to another. For example, a pipe network can supply drinking water from a treatment plant to individual buildings, can transport waste water from individual buildings back to a central treatment location, can transport oil from a port or production point to a refinery, and can transport natural gas (in either gas or liquid form) from a production point to a central location, and from a central location to individual buildings for use.

A pipe network requires inspection. A pipe network operator performs inspection to determine whether the network is in good operating condition, and to identify portions of the network that require preventative maintenance or repair of an identified problem. For example, a pipe network can leak. A leak of a small (below a threshold) volume of material, at a slow (below another threshold) rate, may be normal for a particular material transported in the pipe network. However, a leak of a volume or rate above their respective thresholds can result in an undesirable loss of material from the pipe network, as well as undesirable hazard or consequences to the environment outside the pipe network.

While a leak emanating from the pipe network may be detectable from outside the network, many problems are more easily/efficiently/closely detected from inside the pipe network. For example, a portion of a pipe network can also become partially or completely blocked, impeding a flow of material within that portion of the pipe network. Although the effects of such a blockage can be inferred using fixed-location flow sensors within the pipe network, an extremely dense set of the flow sensor network is required to determine an exact location of the blockage. As well, images of the blockage are helpful in assessing the severity of the blockage and ameliorating the problem.

A pipe network operator may want to inspect the pipe network to determine if there are areas where material within the pipeline does not meet a particular quality standard. For example, water from outside may leak into a pipe carrying oil, degrading the oil quality below an oil purity threshold. Isolating such a problem to a small portion of a pipe network simplifies maintenance of the pipe network.

As another example, a pipe network operator may want to update a map of a pipe network, for planning, monitoring, or other reasons. An older pipe network may have been modified over time, without corresponding updates of a map of the network. In addition, those seeking to divert material from a pipe network, in an unauthorized manner, may have modified the network without notifying the operator.

Depending on the material transported within a pipe network, the pipe network can require regular maintenance. For example, cleaning an inside surface of a pipe can prevent a blockage from forming. As well, if inspection results indicate a problem with the pipe network, the problem must be repaired.

Portions of a pipe network may be difficult to access from outside an individual pipe—for example, because they are underground. Thus, in-pipe inspection and maintenance can be more efficient than inspection from the outside.

An autonomous in-pipe vehicle, or pipe AV, can be used to inspect, clear blockages, and perform repairs from within a network of pipes. A pipe AV, as used herein, is an autonomous vehicle, adapted for operation within a pipe network in which material flows, that is capable of autonomously traversing a route within the pipe network.

SUMMARY

The illustrative embodiments provide a method, system, and computer program product. An embodiment includes a method that charges a rechargeable power source in an autonomous vehicle (AV) adapted to traverse within a pipe network, the charging using mechanical power derived from a flow of material within the pipe network. An embodiment powers a sensor in the AV from the charged rechargeable power source. An embodiment causes, using power from the rechargeable power source, the AV to traverse within the pipe network.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
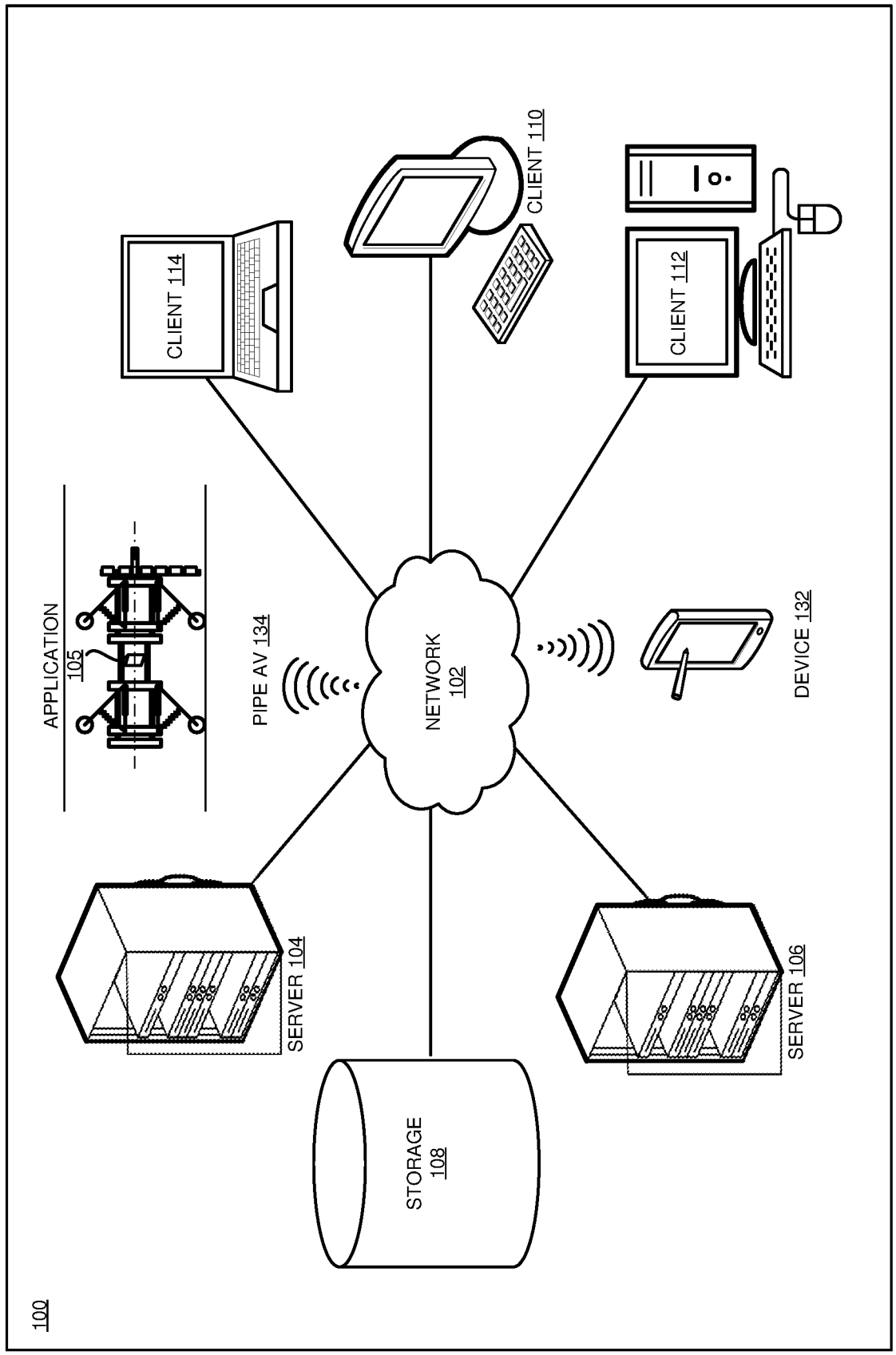
FIG. 1 depicts a block diagram of a network of data processing systems in which illustrative embodiments may be implemented.

The illustrative embodiments recognize that currently, pipe AVs are not able to gain energy from the flow of material around themselves within a pipe network. One type of presently used pipe AV is hardwired to its energy source, limiting the range of such an AV. Another type of presently used pipe AV includes a battery that is not rechargeable using the flow of material within a pipe network, limiting the time of operation of such an AV within the network.

In addition, the illustrative embodiments recognize that currently, presently used pipe AVs are not able to modify their routing or tasking within a pipe network based on an unmapped or unforeseen condition within the network. For example, the illustrative embodiments recognize that if a pipe AV encounters an unmapped section of the pipe network, it would be desirable to report, inspect and map that section, either using this pipe AV or another pipe AV at a later time. Similarly, the illustrative embodiments recognize that if a pipe AV encounters a blockage within the pipe network during inspection, necessitating a different route, it might be more efficient to modify the preplanned route and continue the inspection along the modified route than to abort the inspection at the blockage. And if the pipe AV has the capability to ameliorate a blockage it encounters during inspection, the illustrative embodiments recognize that it might be efficient to modify the pipe AV's current task from inspection to blockage amelioration. Once the blockage has been ameliorated, the pipe AV can then return to its original task and route.

The illustrative embodiments also recognize that currently, a presently used pipe AV is unable to cooperate with another pipe AV to complete a preplanned routing within a pipe network. For example, the illustrative embodiments recognize that if one pipe AV encounters a situation (e.g., a blockage) preventing it from accessing a particular section of the pipe network, a second pipe AV, also operating or available to operate within the pipe network, may be able to access that section from another access point, avoiding the blockage. If the two AVs were able to cooperate, either directly with each other or through an intermediary, the illustrative embodiments recognize that the second AV could access the blocked section, while the first AV could perform a different task.

Consequently, the illustrative embodiments recognize that there is a need for a pipe AV that can gain energy from the flow of material around itself within a pipe network. The pipe AV should also be able to modify its routing while within a pipe network based on conditions encountered therein, and cooperate with another pipe AV to modify the other pipe AV's routing.

The illustrative embodiments recognize that the presently available tools or solutions do not address these needs or provide adequate solutions for these needs. The illustrative embodiments used to describe the invention generally address and solve the above-described problems and other problems related to route modification and recharging for autonomous in-pipe vehicles.

An embodiment can be implemented as a software application. The application implementing an embodiment can be configured as a modification of an existing pipe AV system, as a separate application (running in a pipe AV system or in another system in communication with a pipe AV system) that operates in conjunction with an existing pipe AV system, a standalone application, or some combination thereof.

Particularly, some illustrative embodiments provide a method by which a pipe AV can autonomously traverse a pipe network. As part of the traversal, the pipe AV can also recharge itself using a flow of material within the pipe network, monitor an environmental condition within the pipe network, and update a map of the pipe network.

An embodiment in a pipe AV includes a propulsion module. The propulsion module moves the pipe AV within a pipe network. If a pipe AV has wheels, the propulsion module causes one or more of the wheels to move, thus propelling the pipe AV. If a pipe AV has legs and feet, the propulsion module causes the legs and feet to move in a walking motion, thus propelling the pipe AV. If a pipe AV has articulated segments, the propulsion module causes the articulated segments to articulate in a snake-like motion, thus propelling the pipe AV. If a pipe AV has a propeller, the propulsion module causes the propeller to rotate, thus propelling the pipe AV. If a pipe AV has another type of propulsion mechanism, the propulsion module causes that propulsion mechanism to propel the pipe AV.

An embodiment in a pipe AV includes a flow sensor adapted to measure a flow of material in the pipe network. Several types of flow sensors are known in the prior art. In one type of flow sensor, a flow of material turns a magnetized rotor. A hall-effect sensor generates a voltage pulse signal based on the rotation rate of the rotor. A microcontroller converts the voltage pulse signal into a flow rate measurement. In other types of flow sensors, a propeller or impeller partially covered with conductive material turns at a rate that changes according to a flow of material, and an ultrasonic sensor or an inductive sensor, such as an inductor capacitor, giant magnetoresistive sensor, or tunnel magnetoresistive sensor, converts the rotation rate of the conductive portion to an electrical signal. A microcontroller converts the electrical signal into a flow rate measurement.

A flow rate can be used to estimate a diameter of a pipe in which material is flowing, using the expression:

$$Q = A \cdot v$$

where Q is the volumetric flow in meters cubed per hour, A is the cross-section area where the fluid is flowing in meters squared, and v is the mean velocity in meters per second. An embodiment can measure mean velocity using two sensors a known distance apart within the pipe AV. For example, an embodiment detects, using optical, electrostatic, or a combination of optical and electrostatic sensors, debris or solid particles present in the fluid flow. An embodiment derives the mean velocity from the time taken for the debris to move from one sensor to the other. Alternatively, if the diameter of the pipe is measured using another sensor, the same expression can be used to derive a flow rate.

An embodiment in a pipe AV can be configured to include other sensors, such as an obstacle sensor, camera, and environmental sensor. Another embodiment in a pipe AV can be configured to receive the flow measurements from detached sensors, e.g., sensors installed in the pipeline, that are configured for communicating with the pipe AV.

An obstacle sensor can be a physical probe and a contact sensor that, together, detect a presence or absence of an object or pipe surface near the pipe AV. An obstacle sensor can also be any suitable signal-based distance sensing mechanism that is appropriate to the pipe network environment, such as optical, electrostatic, sonar, lidar, or radar. An embodiment uses an obstacle sensor to detect an obstacle within a pipe. An embodiment also uses an obstacle sensor to detect an absence of an obstacle, such as a junction between two or more sections of pipe. In one embodiment, the obstacle sensor is detached from, but in data communication with, the pipe AV. For example, a separately mobile sensor platform may be physically discontented from the pipe AV but may maintain data connectivity with the pipe AV. Obstacle sensor as well as other sensors or devices contemplated herein can also be installed on such a detached sensor platform without departing the scope of the illustrative embodiments.

An embodiment uses an imaging device, e.g., a visible light camera, an infrared imaging device, an x-ray imaging device, an alpha or gamma ray imaging device, or some combination thereof, to obtain images of the interior of a pipe network. Such images can be used to evaluate a condition of an interior surface of a pipe within the pipe network, to evaluate an obstacle within the pipe network, and for other uses.

An embodiment uses an environmental sensor to measure an aspect of an environment within a pipe network. For example, a pH sensor can be used to monitor the pH level of a pipe network carrying drinking water, for use in ensuring that the pH of the drinking water remains within a specified range. Similarly, an algae sensor can be used to monitor an amount of algae present in a liquid carried by the pipe network, for use in ensuring that the algae level of, for example, piped drinking water remains within a specified range. A moisture sensor can be used to monitor an amount of water present within a pipe network intended to transport another material. For example, a higher-than-normal percentage of water within a pipe network carrying oil or natural gas could indicate that water is leaking into the pipe network, potentially requiring repair. An embodiment may also include another sensor capable of monitoring an environment within a pipe network, and the same is contemplated within the scope of the illustrative embodiments.

An embodiment in a pipe AV includes a communications module, for communicating with a control center and, optionally, with another pipe AV, a detached sensor platform, or some combination thereof. An embodiment uses the communications module to communicate the pipe AV's status (such as its location), images and measurements obtained by the pipe AV, and other information to a control center. An embodiment uses the communications module to receive commands and other information from control center.

An embodiment in a pipe AV includes a rechargeable power source, such as a battery or other types of energy storage cells. The rechargeable power source is capable of being recharged using a flow of material in a pipe network in which the pipe AV operates. An embodiment in a pipe AV also includes an anchor module adapted to, when activated, hold a pipe AV in a location in the pipe network. The anchor deployed by the anchor module may be frictional, magnetic, adhesive, force applying, or some combination thereof, and may be invasive (digging into) or non-invasive (attaching to a surface in a non-destructive way) to the material of the pipe itself.

To recharge itself, an embodiment determines, using a flow sensor, that the rate of flow of material around the pipe AV within the pipe network is within a range suitable for recharging the pipe AV. A range includes a lower threshold, below which the flow is too slow to recharge the pipe AV. A range also includes an upper threshold, above which the flow is too fast to safely recharge the pipe AV and could potentially damage the pipe AV.

If the rate of flow is within a predetermined or configured range, and if recharging the pipe AV requires that the pipe AV be stationary while recharging, an embodiment uses the anchor module to anchor itself. As used herein, anchoring refers to holding a pipe AV in place within the pipe network. In one embodiment, a motor turns a gear which moves an anchor pack, moving an anchor pin outward into contact with an inner surface of a pipe. In another embodiment, an amount of energy keeps an anchor pin retracted. When the source of energy is removed, the anchor pin is released, moving outward into contact with an inner surface of a pipe. One embodiment includes two or more anchor modules, each including a single anchor pin. Each anchor pin extends outward from the pipe AV to an inner surface of a pipe in a pipe network, thus holding the pipe AV in place within the pipe. Another embodiment includes only one anchor module, the anchor module including more than one anchor pin assembly holding the pipe AV in place within the pipe when activated. An embodiment can also include a pipe AV having another anchoring apparatus, and the same is contemplated within the scope of the illustrative embodiments.

Once the pipe AV is anchored, an embodiment uses a recharge module to generate electricity to recharge a battery of the pipe AV using the flow of material within the pipe network. In one example of a recharge model, a flow of material within a pipe network turns a wheel, generating electricity that charges a battery. When an embodiment determines that a battery in the pipe AV has been recharged above a threshold, or that the flow of material within the pipe network has changed to be outside the range suitable for recharging the pipe AV, an embodiment ceases the recharging and retracts any deployed anchor pins, thus allowing the pipe AV to move within the pipe network.

An embodiment in a pipe AV may also include additional capabilities. One embodiment includes an actuator adapted to cleaning an inner surface of a pipe. Another embodiment includes an actuator adapted to collecting a physical sample of material, from the material flowing through the pipe network, from a portion of the pipe, from an obstacle encountered within the pipe, or from another source. One embodiment can analyze the physical sample in-situ (on-board the pipe AV), while another embodiment stores the sample for later analysis at a different location, such as a laboratory. An embodiment in a pipe AV may also include additional sensing, monitoring, collecting, and analysis capabilities, and the same are contemplated within the scope of the illustrative embodiments.

An embodiment makes use of a database of information about a pipe network in which the embodiment is to be used. The database includes a map of the pipe network, or other information that can be used to construct a map. The database can also include other information, such as an entry or exit point suitable for the pipe AV. The database also includes other information about the pipe network, such as, for example, the type, diameter or dimensions, flow capacity, pressure capacity, material, setup date, and other data regarding the pipes and connectors comprising the pipe network. The database also includes other information about the material flowing within the pipe network, such as an expected flow rate of the material in a portion of the pipe network, an acceptable range for measurements of the material transported in the pipe network, and safety precautions relevant to a specific material. For example, some materials are associated with a greater than a threshold risk of fire (e.g. oil, natural gas) than others (e.g. water). Such a database can be implemented as a relational database, containing attributes for each part of the network, or as a graph representing a map of the network and associated data. Other database implementations are also possible and contemplated within the scope of the illustrative embodiments.

An embodiment receives a mission from a user or another system. A mission specifies one or parameters for a pipe AV's actions within a pipe network. One type of mission specifies a portion of a pipe network to be traversed. Another type of mission specifies an entry point into the pipe network, an exit point from the pipe network, or both. Another type of mission specifies a complete path through the pipe network, from entry to exit.

A mission also specifies an action the pipe AV is to take within the pipe network. Depending on the capabilities of the pipe AV, such an action can be cleaning, inspection for obstacles, flow monitoring, material quality monitoring, pipe environment monitoring, map updating, removal of obstacles, pipe repair, another action, or a combination of multiple actions.

From the received mission, using the database, an embodiment plans a route through a pipe network for one or more pipe AVs. A route begins at a designated point in the pipe network, including but not limited to an entry point into the pipe network, specifies a combination of a distance to travel through a particular pipe and a direction of turn, if any, at a particular pipe intersection, and ends at an exit point from the pipe network.

Within the route, an embodiment also plans one or more actions that are to occur at a specific location or a specific portion of the route. One example mission could specify that a pipe AV is to inspect and, if possible, remove a suspected obstacle in a pipe section between junction A and junction B within a pipe network. From this specification, an embodiment selects an entry point near either junction A or junction B, and plans a route from the entry point to the pipe section containing the suspected obstacle.

If more than one pipe AV is available, an embodiment also plans routes and, if appropriate, specific actions, for each pipe AV participating in the mission. For example, if two pipe AVs are available for a mission to clean a portion of the pipe network, an embodiment could plan two routes, one for each AV, to each traverse and clean half the pipe network.

As part of route planning, under certain circumstances, an embodiment plans one or more locations at which to recharge the pipe AV. A planned location at which to recharge the pipe AV can be one where, according to information in the database, material flow is within a configured range for recharging and the pipe diameter both large enough to accommodate the pipe AV and small enough that anchor pins of the pipe AV can anchor the pipe AV in place during recharging.

An embodiment in a pipe AV begins to traverse the pipe network from a designated starting point, e.g., but not limited to, an entry point. Optionally, an embodiment initially follows a planned route. While traversing the pipe network along the planned route, an embodiment in a pipe AV performs any specified tasks, such as cleaning an inner surface of a portion of the pipe network, monitoring an environmental condition within the pipe network, and communicating the pipe AV's findings and status with another system or another pipe AV.

If an embodiment in a pipe AV reaches a planned recharge location, the pipe AV requires recharging, and conditions are suitable for recharging (i.e., material flow is within a suitable range for recharging, the pipe diameter both large enough to accommodate the pipe AV and small enough that anchor pins of the pipe AV can anchor the pipe AV in place during recharging), an embodiment causes the pipe AV to anchor at the location, recharge itself, remove the anchoring, and continue on the planned route.

In addition, as a pipe AV traverses a portion of the pipe network, an embodiment also records locations the pipe AV passes that are suitable for recharging the pipe AV. An embodiment ensures that a pipe AV always has sufficient stored energy to reach a known-suitable recharge location. Thus, if a planned recharge location proves unsuitable or unreachable, or a route for the pipe AV changes, the pipe AV can return to a previous known-suitable recharge location and recharge its battery, thus avoiding stranding the pipe AV with a depleted battery in conditions that are unsuitable for recharging.

While a pipe AV traverses a pipe network, an embodiment uses the results of its environmental condition monitoring to correlate a traversed portion of the pipe network with a stored map and related database information of the traversed portion. For example, the stored information may indicate that between location A to location B in the pipe network, a material flow rate, material quality, and pipe diameter are all expected to remain constant at particular values. If, as the pipe AV actually traverses the pipe network from location A to location B, monitoring indicates that conditions are as expected, no map updates are needed. However, as the pipe AV traverses from location A to location B, monitoring may indicate a location where material flow rate is more than a threshold amount different from the expected constant or changes by above a threshold amount from the expected constant rate. In addition, at this same location, measurements of the pipe diameter may change from the expected diameter to a value too large for the measuring equipment to measure. Together, the flow rate and diameter deviations from the expected values indicate an unmapped junction in the pipe network.

An unmapped pipe junction is only one possible divergence between expected conditions, as mapped and stored in a database, and actual conditions within the pipe network. An obstacle may block part or all of a section of pipe. Environmental conditions may be different from expected, due to a leak (into or out of the pipe network), unmapped addition to the pipe network, obstacle, or another factor. As well, changed environmental conditions can alter a suitability of a particular planned recharge location for the pipe AV, or a planned recharge location may no longer be reachable.

Thus, while traversing a pipe network an embodiment in a pipe AV may encounter an unexpected condition. An unexpected condition is a condition that prompts a change in a planned route or a change in an action taken by the pipe AV.

An embodiment responds to the unexpected condition. If the unexpected condition prompts a change in a planned route, an embodiment computes a new route. For example, if an embodiment discovers an unmapped addition to a pipe network, the embodiment incorporates an exploration of the unmapped addition into its current route. Similarly, if an embodiment discovers an obstacle blocking access to a section of a pipe network, the embodiment reroutes around the obstacle to access the section via another route.

As a pipe AV traverses a previously-unmapped portion of the pipe network, an embodiment reports actual conditions the pipe AV finds, for use in updating a map of the pipe network. An embodiment also reports other unexpected conditions, such as the presence of an obstacle or a deviation from an expected environmental condition, to a control center. For example, if an embodiment detects an obstacle, a leak, or another condition requiring repair, appropriate personnel or equipment will need to be dispatched to perform the repair.

An embodiment also communicates with another pipe AV to cooperate with the other pipe AV. For example, two pipe AVs can divide a preplanned route, completing the route more quickly than one pipe AV could do so. If one pipe AV cannot access part of a planned route, another pipe AV may be able to access that portion starting from a different location.

While traversing the pipe network, an embodiment in a pipe AV predicts a future environmental condition for a location in the pipe network. In one embodiment, the future environmental condition includes whether the location is expected to be a suitable location for recharging the pipe AV. If the location is expected to be suitable, an embodiment also determines whether the pipe AV can reach the suitable location, given the pipe AV's current level of battery charge and predicted environmental conditions between the pipe AV's current location and the suitable location. If the suitable location is also reachable, the pipe AV can traverse the pipe network to the suitable location and recharge itself there.

Once example environmental condition is a flow rate of material in a portion of the pipe network. A flow rate can be faster in one portion of the pipe network than in another portion of the pipe network. Data of the pipe network can include different flow rates for different portions of the pipe network. Because a fast flow rate can recharge a pipe AV more quickly, an embodiment might select a recharge location in an area of comparatively fast flow rate. Alternatively, a flow rate might be above a potential damage threshold flow rate for the pipe AV. In other words, attempting to recharge using an overly fast flow rate could damage the recharge module, the battery, or another module of the pipe AV. To avoid such an overly fast flow rate, an embodiment might select a recharge location in an area of flow rate below the potential damage threshold.

The manner of route modification and recharging for autonomous in-pipe vehicles described herein is unavailable in the presently available methods in the technological field of endeavor pertaining to autonomous vehicles for in-pipe use. A method of an embodiment described herein, when implemented to execute on a device or data processing system, comprises substantial advancement of the functionality of that device or data processing system in charging, using a flow of material within a pipe network, a rechargeable power source in a pipe AV. In addition, the method also traverses a portion of the pipe network, monitoring an environmental condition within the network and updating a map of the network.

The illustrative embodiments are described with respect to certain types of pipe AVs, routes, maps, obstacles, pipe networks, pipe junctions, forecasts, thresholds, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
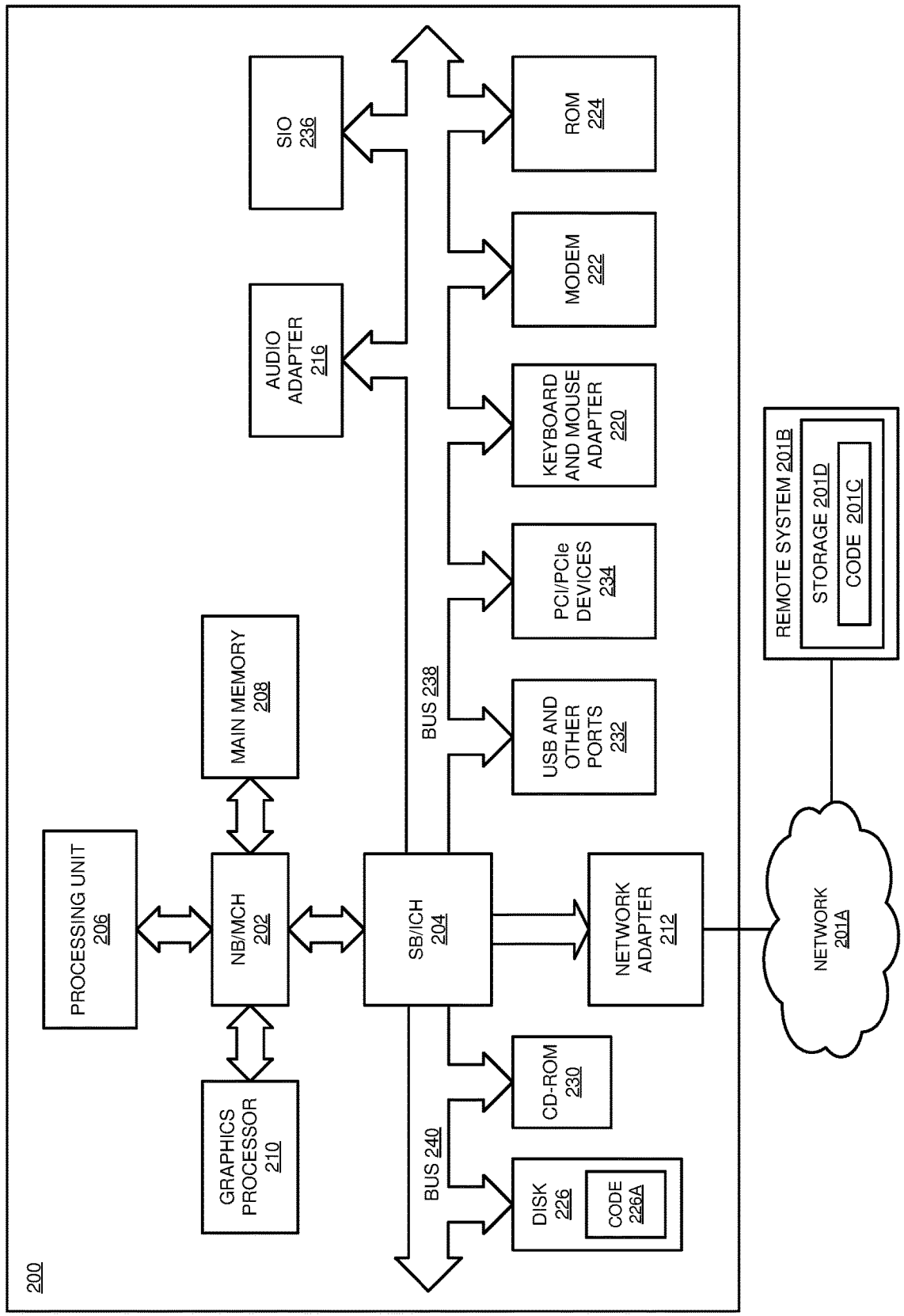
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Pipe AV 134 is an example of a pipe AV described herein. For example, pipe AV 134 can take the form of an AV adapted for use in a pipe network. Pipe AV 134 includes a processor and a memory, and any software application described as executing in another data processing system in FIG. 1 can be configured to execute in pipe AV 134 in a similar manner. Any data or information stored or produced in another data processing system in FIG. 1 can be configured to be stored or produced in pipe AV 134 in a similar manner.

Application 105 implements an embodiment described herein. Application 105 runs in pipe AV 134. Alternatively, a portion of application 105 runs in pipe AV 134, and a portion of application 105 runs in another location, such as servers 104 and 106 and clients 110, 112, and 114. In addition, pipe AV 134, storage 108, or another storage location may store information about a pipe network, such as a map and environmental conditions within the pipe network. The depiction of pipe AV 134 is only illustrative and not intended to be limiting on the illustrative embodiments. Any appendages, features, extensions, tools, mechanisms depicted in the drawings are only non-limiting examples of shape, size, function, orientation, or purpose.

Servers 104 and 106, storage unit 108, and clients 110, 112, and 114, pipe AV 134, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
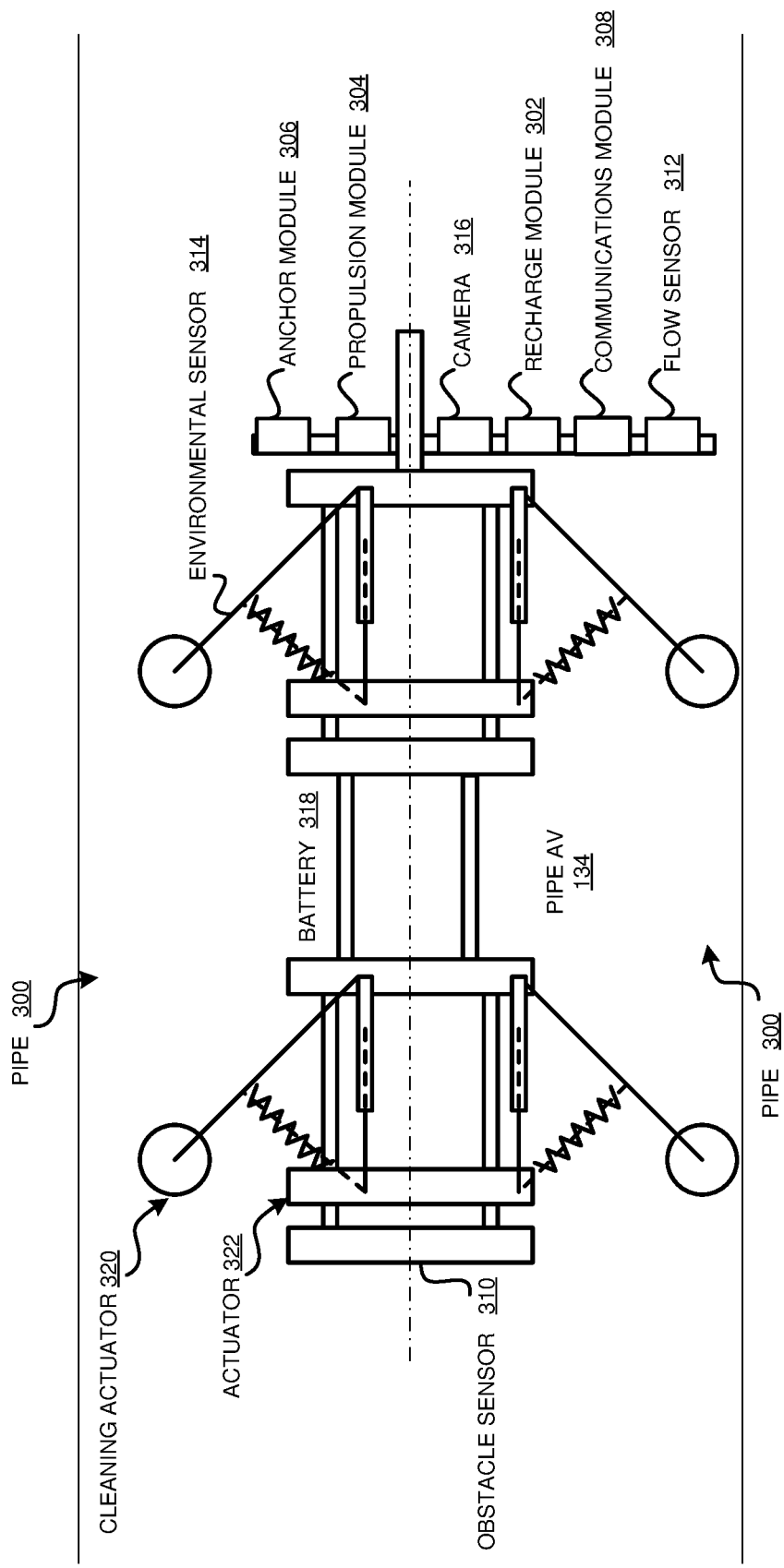
FIG. 3 depicts more detail of a pipe AV in which illustrative embodiments may be implemented.

With reference to FIG. 3, this figure depicts more detail of a pipe AV in which illustrative embodiments may be implemented. In particular, pipe AV 134 is the same as pipe AV 134 in FIG. 1.

Pipe AV 134 is depicted inside pipe 300. Pipe AV 134 includes propulsion module 304. Propulsion module 304 moves the pipe AV within a pipe network, using a suitable propulsion mechanism.

Pipe AV 134 includes flow sensor 312 adapted to measure a flow of material in the pipe network. Pipe AV 134 also includes communications module 308, for communicating with a control center and with another pipe AV 134.

Pipe AV 134 also includes obstacle sensor 310. Obstacle sensor 310 can be a physical probe and a contact sensor that, together, detect a presence or absence of an object or pipe surface near pipe AV 134. Obstacle sensor 310 can also be any suitable signal-based distance sensing mechanism that is appropriate to the pipe network environment, such as optical, electrostatic, sonar, lidar, or radar. Using obstacle sensor 310, pipe AV 134 can detect an obstacle within a pipe, and can detect an absence of an obstacle, such as an junction between two or more sections of pipe.

Pipe AV 134 also includes camera 316 to obtain images of the interior of a pipe network. Such images can be used to evaluate a condition of an interior surface of a pipe within the pipe network, to evaluate an obstacle within the pipe network, and for other uses.

Pipe AV 134 also includes environmental sensor 314 to measure an aspect of an environment within a pipe network. Environmental sensor 314 can be, for example, a pH sensor, an algae sensor, a moisture sensor, or another sensor capable of monitoring an environment within a pipe network.

Pipe AV 134 also includes battery 318, a rechargeable power source, and recharge module 302. Recharge module 302 recharges battery 318 using a flow of material in a pipe network in which pipe AV 134 operates. Pipe AV 134 also includes anchor module 306 adapted to, when activated, hold pipe AV 134 in a location in the pipe network.

Pipe AV 134 also includes cleaning actuator 322, which is adapted to cleaning an inner surface of pipe 300. Pipe AV 134 also includes actuator 320, which is adapted to collecting a physical sample of material, from the material flowing through the pipe network, from a portion of the pipe, from an obstacle encountered within the pipe, or from another source.

Figure 4:
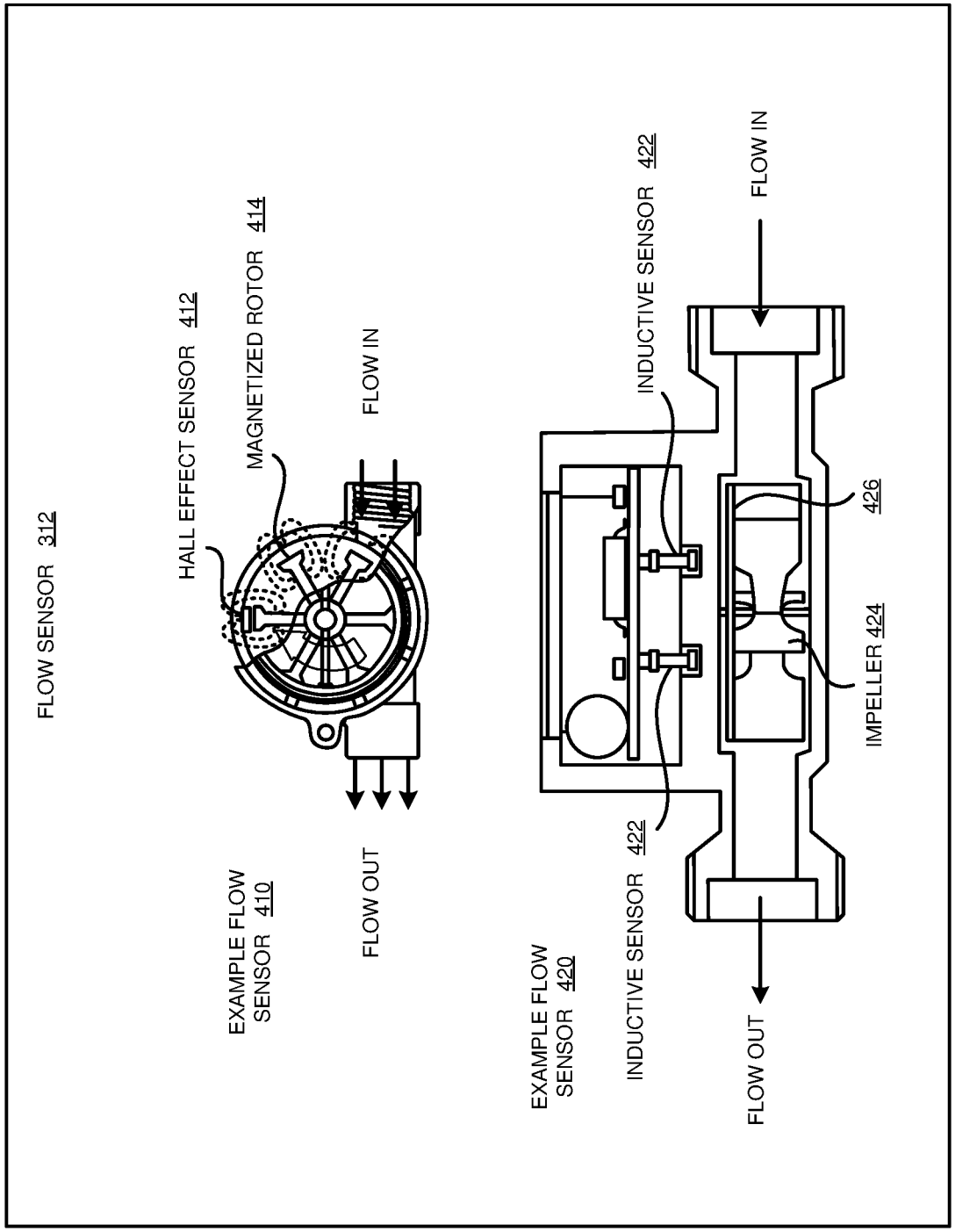
FIG. 4 depicts more detail of two example configurations for a flow sensor for use in a pipe AV in which illustrative embodiments may be implemented.

With reference to FIG. 4, this figure depicts more detail of two example configurations for a flow sensor for use in a pipe AV in which illustrative embodiments may be implemented. In particular, both example flow sensor 410 and example flow sensor 420 are examples of flow sensor 312 in FIG. 3.

In example flow sensor 410, material flows from right to left as shown, causing magnetized rotor 414 to turn at a rate that changes according to a flow of material. Hall-effect sensor 412 generates a voltage pulse signal based on the rotation rate of rotor 414. A microcontroller (not shown) converts the voltage pulse signal into a flow rate measurement.

In example flow sensor 412, material flows from right to left as shown, causing impeller 424 to turn at a rate that changes according to a flow of material. Impeller 424 includes a front side partially covered with conductive material, as shown at location 426. In response, inductive sensors 422 convert the rotation rate of the conductive portion to an electrical signal. A microcontroller (not shown) converts the electrical signal into a flow rate measurement.

Figure 5:
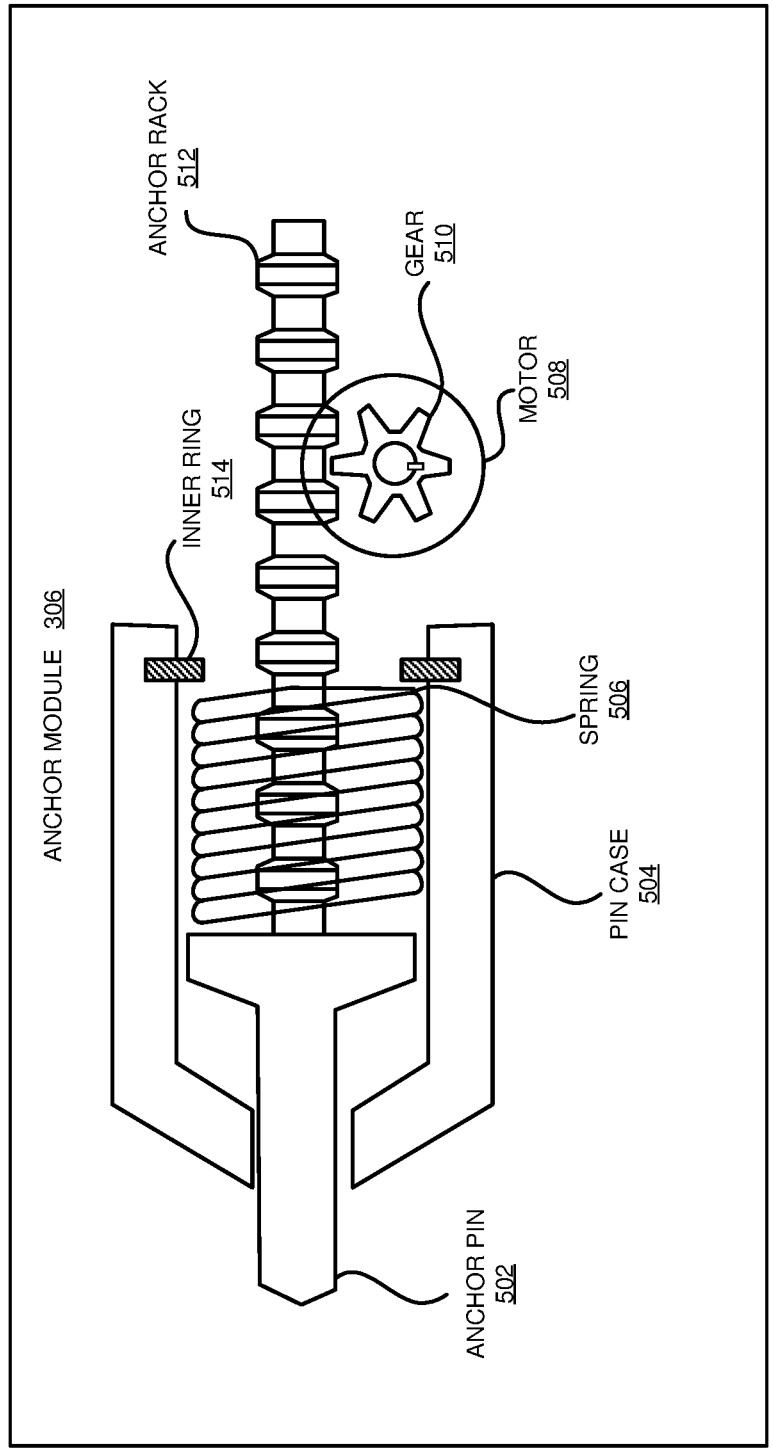
FIG. 5 depicts more detail of an example configurations for an anchor module for use in a pipe AV in which illustrative embodiments may be implemented.

With reference to FIG. 5, this figure depicts more detail of an example configurations for an anchor module for use in a pipe AV in which illustrative embodiments may be implemented. In particular, FIG. 5 depicts more detail of anchor module 306 in FIG. 3.

In particular, anchor module 306 includes anchor pin 502, pin case 504, spring 506, motor 508, gear 510, anchor pack 512, and inner ring 514. In operation, motor 508 turns gear 510, which moves anchor pack 512, moving anchor pin 502 outward into contact with an inner surface of a pipe. To retract anchor pin 502, motor 508 turns gear 510 in the opposite direction, which moves anchor pack 512 and anchor pin 502 inward to be held in place by spring 506.

Figure 6:
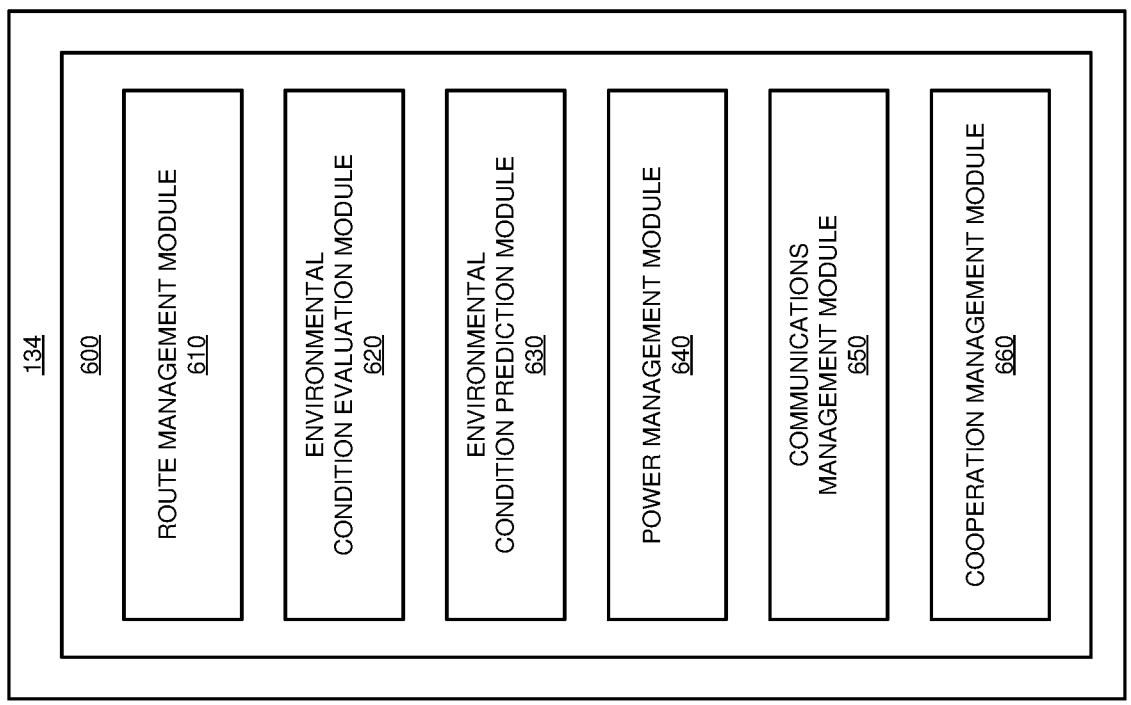
FIG. 6 depicts a block diagram of an example configuration for route modification and recharging for autonomous in-pipe vehicles in accordance with an illustrative embodiment.

With reference to FIG. 6, this figure depicts a block diagram of an example configuration for route modification and recharging for autonomous in-pipe vehicles in accordance with an illustrative embodiment. Application 600 is an example of application 105 in FIG. 1 and executes in pipe AV 134, or in a combination of pipe AV 134 and any of servers 104 and 106 and clients 110, 112, and 114 in FIG. 1.

Route management module 610 receives a mission from a user or another system. From the received mission, using a database of information about a pipe network, module 610 plans a route through a pipe network for pipe AV 134. A route begins at an entry point into the pipe network, specifies a combination of a distance to travel through a particular pipe and a direction of turn, if any, at a particular pipe intersection, and ends at an exit point from the pipe network. Within the route, module 610 also plans one or more actions that are to occur at a specific location or a specific portion of the route. Module 610 also plans one or more locations along a route at which to recharge pipe AV 134. Route management module 610 also directs pipe AV 134 as pipe AV 134 traverses a pipe network.

While pipe AV 134 traverses a pipe network, environmental condition module 620 monitors one or more environmental conditions within the pipe network. Environmental condition module 620 reports actual conditions encountered en route, for use in updating a map of the pipe network. Module 620 also determines other unexpected conditions, such as the presence of an obstacle or a deviation from an expected environmental condition, for reporting to a control center.

Route management module 610 uses the results of environmental condition module 620's monitoring to correlate a traversed portion of the pipe network with a stored map and related database information of the traversed portion. If pipe AV 134 encounters an unexpected condition, route management module 610 forms a new route, reroutes around an obstacle, and performs other routing tasks.

While pipe AV 134 traverses a pipe network, environmental condition prediction module 630 predicts a future environmental condition for a location within the pipe network. The future environmental condition includes whether the location is expected to be a suitable location for recharging pipe AV 134. If the location is expected to be suitable, route management module 610 determines whether pipe AV 134 can reach the suitable location, given pipe AV 134's current level of battery charge and predicted environmental conditions between pipe AV 134's current location and the suitable location. If the suitable location is also reachable, route management module 610 manages pipe AV 134's traversal of the pipe network to the suitable location, and power management module 640 manages the recharge process once there.

While pipe AV 134 traverses a pipe network, power management module 640 monitors energy consumption of pipe AV 134. Module 640 also predicts when pipe AV 134 will require recharging. If pipe AV 134 reaches a planned recharge location, module 640 determines that pipe AV 134 requires recharging, and environmental condition evaluation module 620 determines that conditions are suitable for recharging, module 640 causes pipe AV 134 to anchor at the location, recharge itself, and remove the anchoring. Then route management module 610 continues to manage pipe AV 134's traversal of the pipe network. In addition, as pipe AV 134 traverses a portion of the pipe network, environmental condition evaluation module 620 determines whether locations pipe AV 134 passes are suitable for recharging pipe AV 134. Then, if a planned recharge location proves unsuitable or unreachable, or a route for pipe AV 134 changes, route management module 610 can return pipe AV 134 to a previous known-suitable recharge location where power management module 640 can recharge pipe AV 134.

Cooperation management module 660 manages cooperation with another pipe AV 134. For example, two pipe AVs 134 can divide a preplanned route. As well, if one pipe AV 134 cannot access part of a planned route, another pipe AV 134 may be able to access that portion starting from a different location.

Communications management module 650 communicates with another pipe AV 134 or with a control center to report findings and other status information, and to communicate cooperation information.

Figure 7:
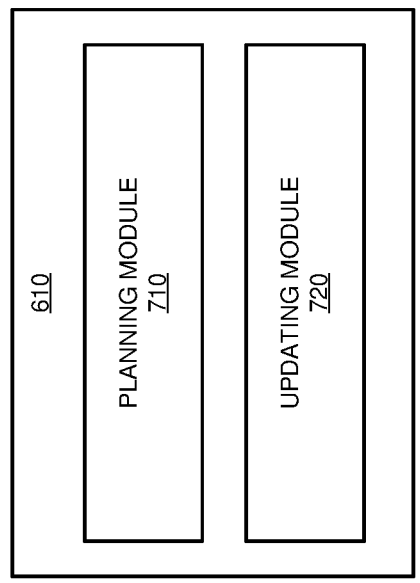
FIG. 7 depicts another block diagram of an example configuration for route modification and recharging for autonomous in-pipe vehicles in accordance with an illustrative embodiment.

With reference to FIG. 7, this figure depicts another block diagram of an example configuration for route modification and recharging for autonomous in-pipe vehicles in accordance with an illustrative embodiment. In particular, FIG. 7 depicts more detail of route management module 610 in FIG. 6.

Planning module 710 plans a route through a pipe network for one or more pipe AVs 134, from a received mission. A route begins at an entry point into the pipe network, specifies a combination of a distance to travel through a particular pipe and a direction of turn, if any, at a particular pipe intersection, and ends at an exit point from the pipe network. Module 710 also plans one or more actions that are to occur at a specific location or a specific portion of the route. Module 710 also plans one or more locations at which to recharge pipe AV 134, As pipe AV 134 traverses a portion of a pipe network and encounters an unexpected condition, updating module 720 responds to the unexpected condition. If the unexpected condition prompts a change in a planned route, updating module 720 forms a new route. For example, updating module 720 can incorporate an exploration of an unmapped addition into a current route, or reroute around an obstacle. Updating module 720 also updates a route as necessary to reach a suitable recharge location.

Figure 8:
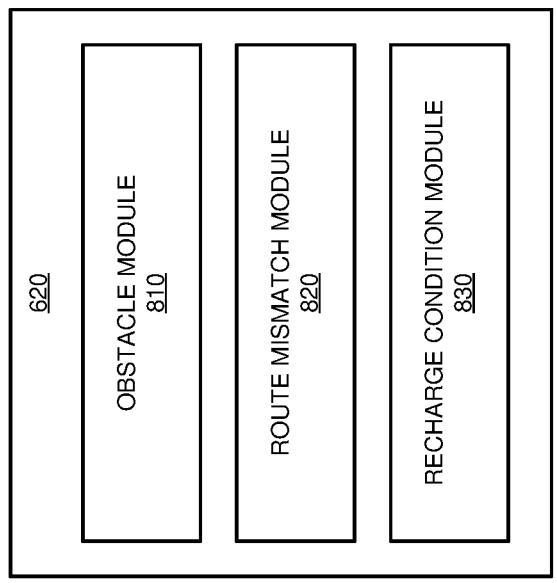
FIG. 8 depicts another block diagram of an example configuration for route modification and recharging for autonomous in-pipe vehicles in accordance with an illustrative embodiment.

With reference to FIG. 8, this figure depicts another block diagram of an example configuration for route modification and recharging for autonomous in-pipe vehicles in accordance with an illustrative embodiment. In particular, FIG. 8 depicts more detail of environmental condition evaluation module 620 in FIG. 6.

Obstacle module 810 detects a presence of an obstacle blocking a path of pipe AV 134. Route mismatch module 820 uses the results of environmental condition monitoring to correlate a traversed portion of the pipe network with a stored map and related database information of the traversed portion. Route mismatch module 820 detects a divergence between the map and actual conditions within the pipe network, for reporting and rerouting. Recharge condition module 830 evaluates monitored environmental conditions for suitability for recharging pipe AV 134. In particular, suitable recharging conditions include material flow being within a suitable range for recharging, and the pipe diameter is both large enough to accommodate pipe AV 134 and small enough that anchor pins of pipe AV 134 can anchor pipe AV 134 in place during recharging.

Figure 9:
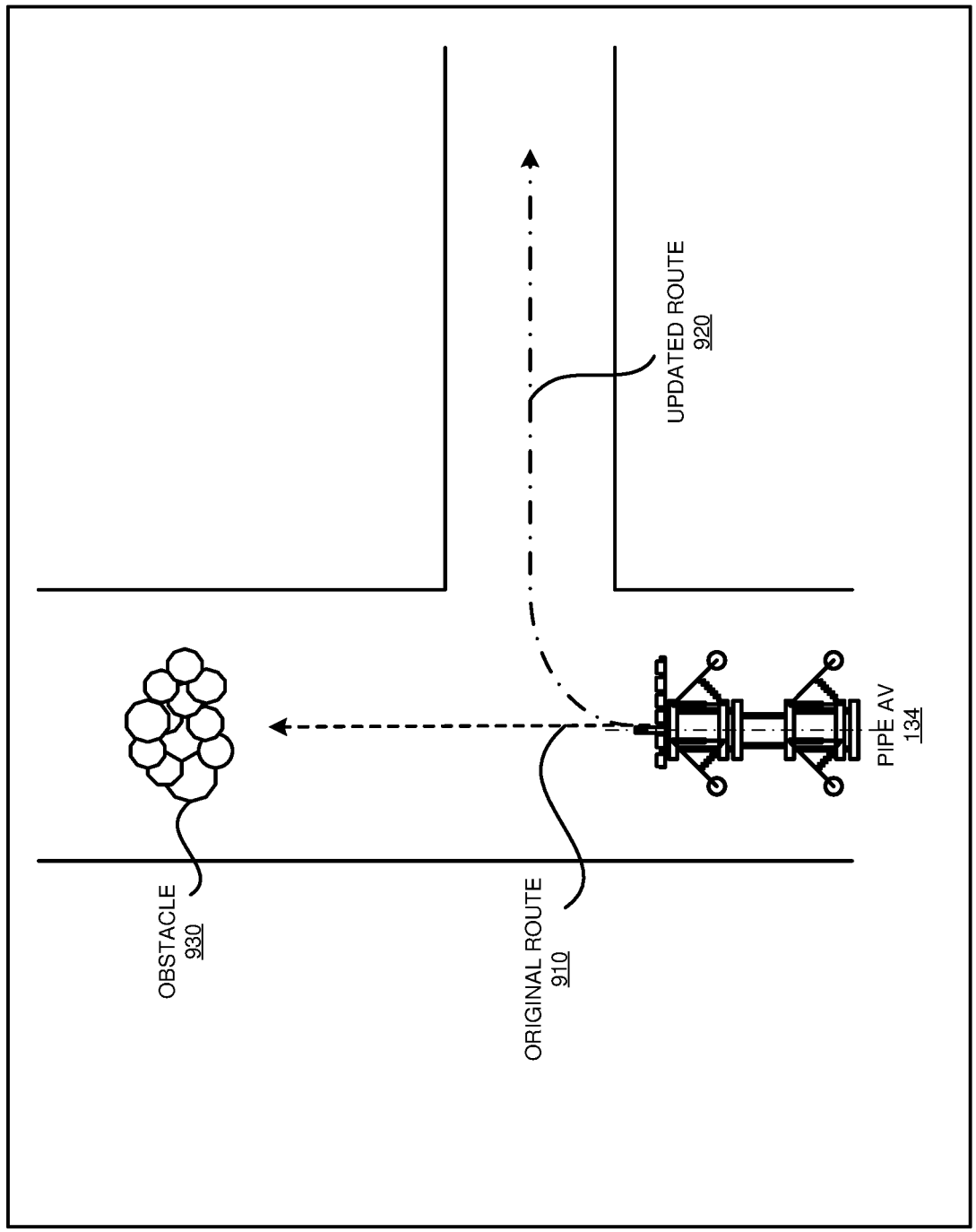
FIG. 9 depicts an example of route modification and recharging for autonomous in-pipe vehicles in accordance with an illustrative embodiment.

With reference to FIG. 9, this figure depicts an example of route modification and recharging for autonomous in-pipe vehicles in accordance with an illustrative embodiment. Pipe AV 134 is the same as pipe AV 134 in FIG. 1 and FIG. 3.

As shown, pipe AV 134 is proceeding along original route 910 when it detects obstacle 930 ahead. Because pipe AV 134 cannot maneuver past obstacle 930 to continue on original route 910, pipe AV 134 reroutes onto updated route 920 instead.

Figure 10:
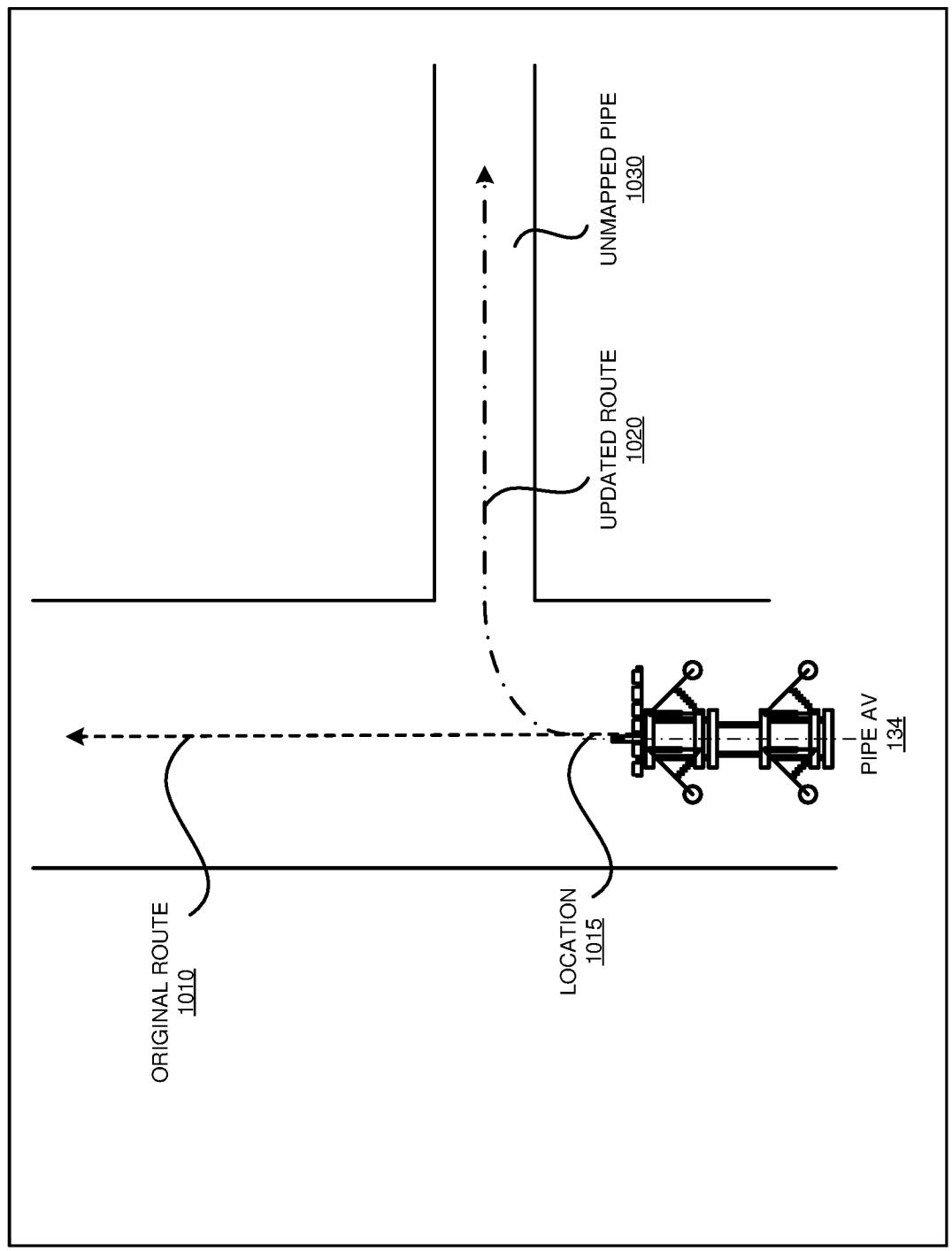
FIG. 10 depicts another example of route modification and recharging for autonomous in-pipe vehicles in accordance with an illustrative embodiment.

With reference to FIG. 10, this figure depicts another example of route modification and recharging for autonomous in-pipe vehicles in accordance with an illustrative embodiment. Pipe AV 134 is the same as pipe AV 134 in FIG. 1 and FIG. 3.

As shown, pipe AV 134 is proceeding along original route 1010. At location 1015, pipe AV 134 detects unmapped pipe 1030 and determines that unmapped pipe 1030 requires traversal. Accordingly, pipe AV 134 reroutes onto updated route 1020.

Figure 11:
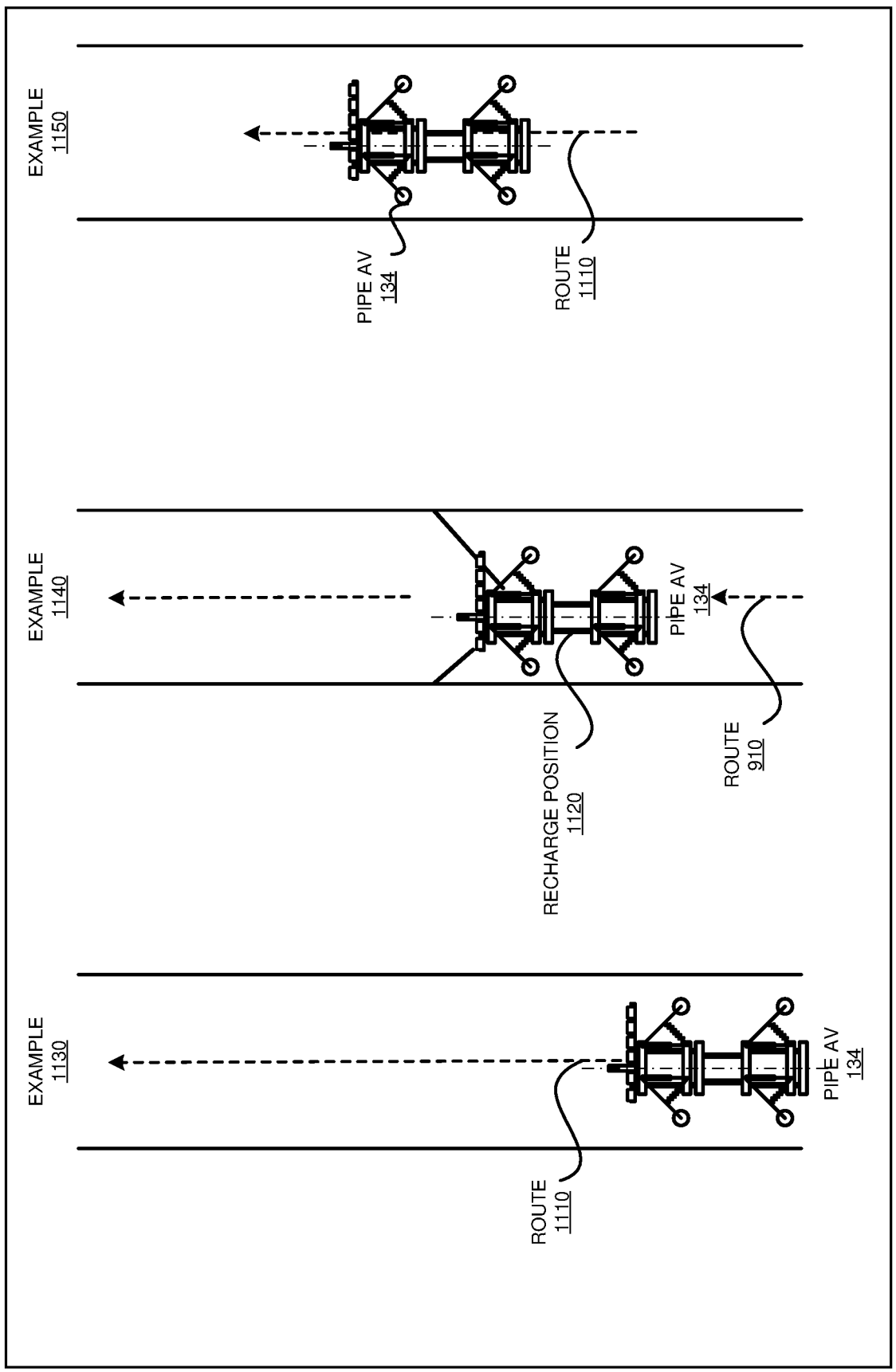
FIG. 11 depicts another example of route modification and recharging for autonomous in-pipe vehicles in accordance with an illustrative embodiment.

With reference to FIG. 11, this figure depicts another example of route modification and recharging for autonomous in-pipe vehicles in accordance with an illustrative embodiment. Pipe AV 134 is the same as pipe AV 134 in FIG. 1 and FIG. 3.

As shown in example 1130, pipe AV 134 is proceeding along route 1110. As shown in example 1140, pipe AV 134 has reached recharge position 1120, has anchored itself, and is recharging. As shown in example 1150, pipe AV 134 has completed the recharge process, has unanchored, and is once more proceeding along route 1110.

Figure 12:
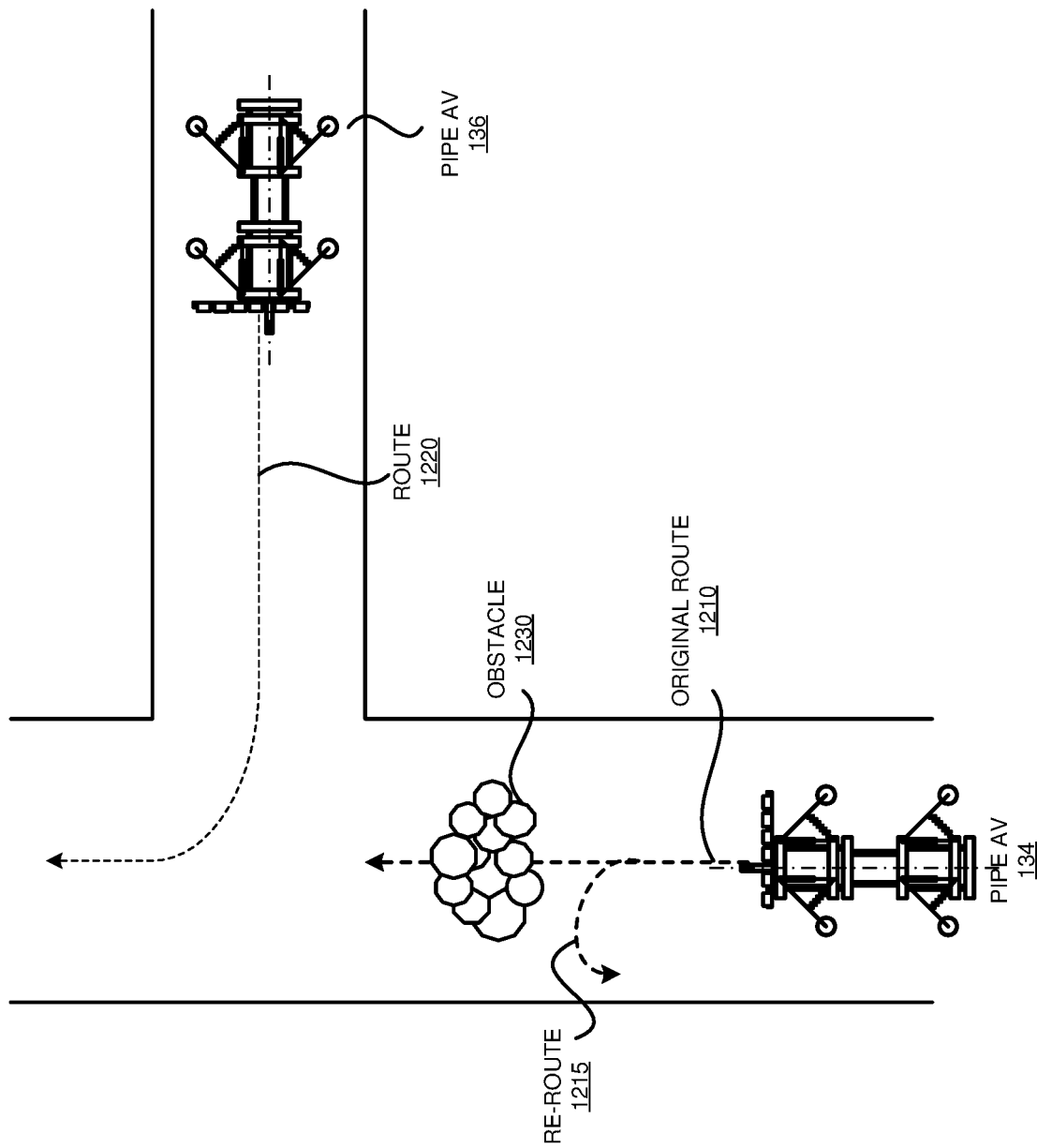
FIG. 12 depicts another example of route modification and recharging for autonomous in-pipe vehicles in accordance with an illustrative embodiment.

With reference to FIG. 12, this figure depicts another example of route modification and recharging for autonomous in-pipe vehicles in accordance with an illustrative embodiment. Pipe AV 134 is the same as pipe AV 134 in FIG. 1 and FIG. 3.

As shown, pipe AV 134 is proceeding along route 1210 when it encounters obstacle 1230. Pipe AV 134 cannot maneuver past obstacle 1230, and must reverse course, as shown by re-route 1215. However, pipe AV 136 is available to be routed onto route 1220, past obstacle 1230, continuing original route 1210 of pipe AV 134.

Figure 13:
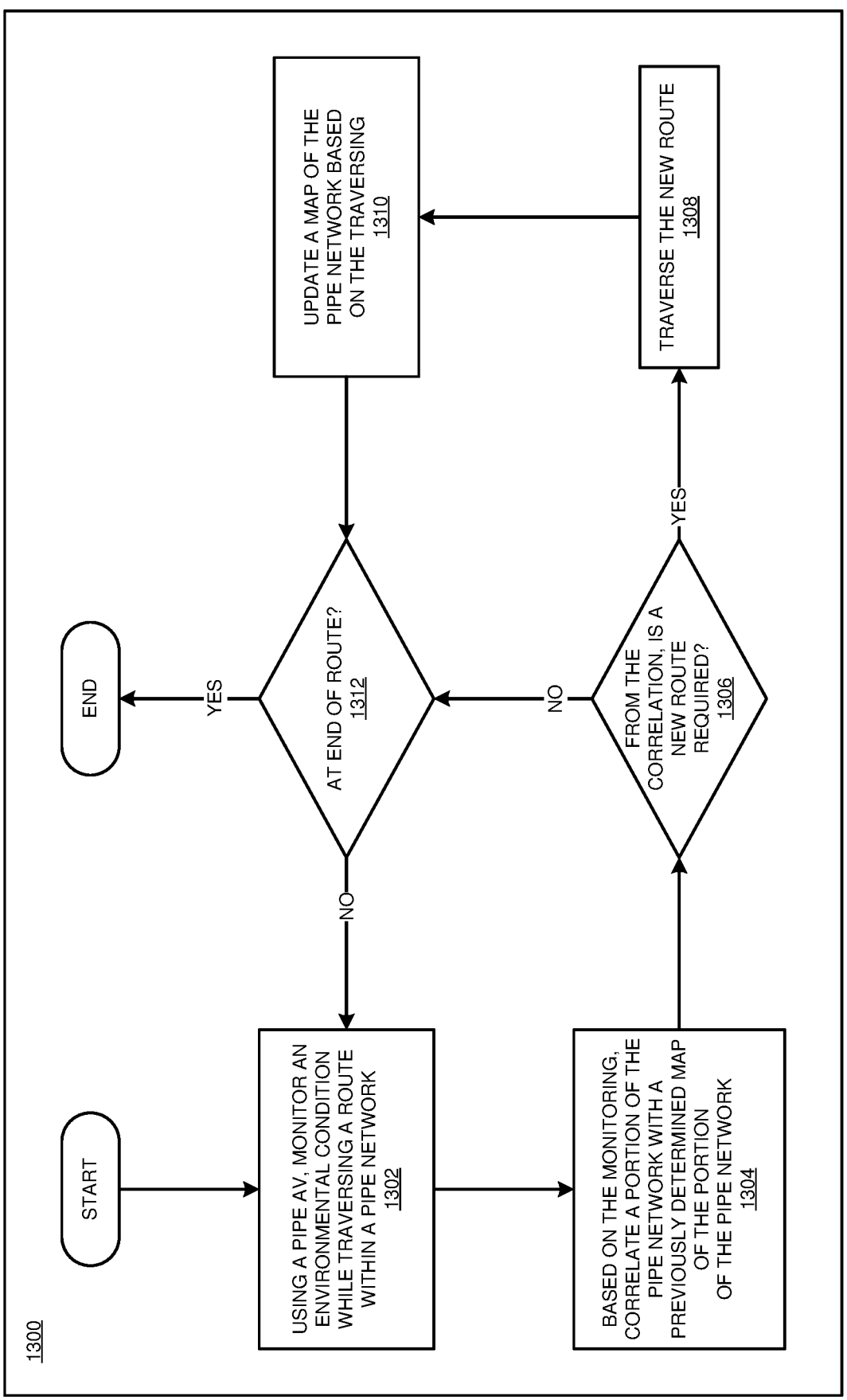
FIG. 13 depicts a flowchart of an example process for route modification and recharging for autonomous in-pipe vehicles in accordance with an illustrative embodiment.

With reference to FIG. 13, this figure depicts a flowchart of an example process for route modification and recharging for autonomous in-pipe vehicles in accordance with an illustrative embodiment. Process 1300 can be implemented in application 600 in FIG. 6.

In block 1302, the application, using a pipe AV, monitors an environmental condition while traversing a route within a pipe network. In block 1304, the application, based on the monitoring, correlates a portion of the pipe network with a previously determined map of the portion of the pipe network. In block 1306, the application determines if, from the correlation, a new route is required. If yes ("YES" path of block 1306), in block 1308 the application traverses the new route and in block 1310 the application updates a map of the pipe network based on the traversing. Then (also "NO" path of block 1306), in block 1312 the application determines whether the pipe AV is at the end of the route. If not ("NO" path of block 1312), the application returns to block 1302. If yes ("YES" path of block 1312), the application ends.

Figure 14:
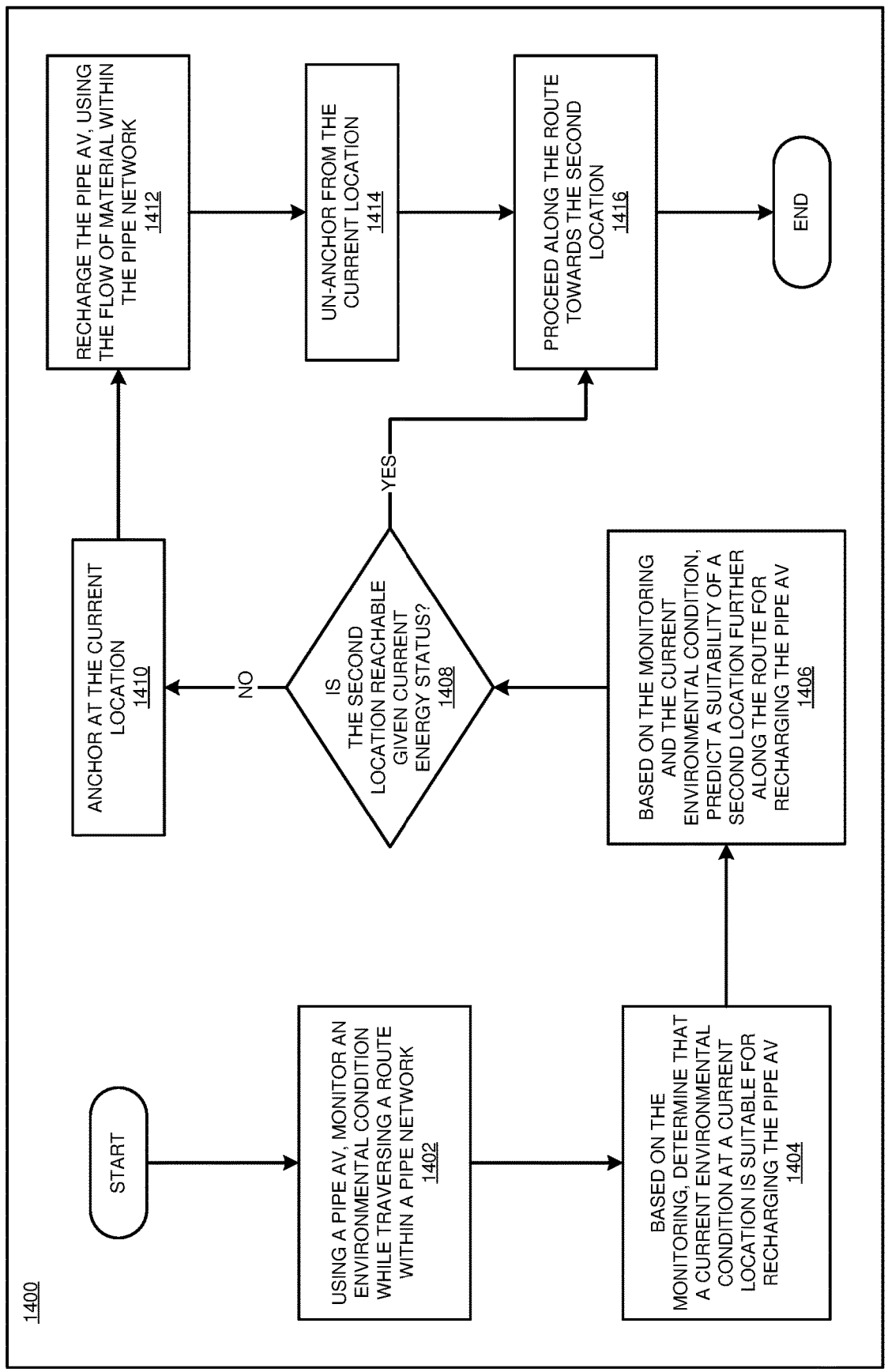
FIG. 14 depicts another flowchart of an example process for route modification and recharging for autonomous in-pipe vehicles in accordance with an illustrative embodiment.

With reference to FIG. 14, this figure depicts another flowchart of an example process for route modification and recharging for autonomous in-pipe vehicles in accordance with an illustrative embodiment. Process 1400 can be implemented in application 600 in FIG. 6.

In block 1402, the application, using a pipe AV, monitors an environmental condition within a pipe network while traversing a route within the pipe network. In block 1404, the application, based on the monitoring, determines that a current environmental condition at a current location is suitable for recharging the pipe AV. In block 1406, the application, based on the monitoring and the current environmental condition, predicts a suitability of a second location further along the route for recharging the pipe AV. In block 1408, the application determines whether the second location is reachable, given the current energy status of the pipe AV. If not ("NO" path of block 1408), in block 1410 the application causes the pipe AV to anchor at the current location. In block 1412, the application causes the pipe AV to recharge, using the flow of material within the pipe network. In block 1414, the application causes the pipe AV to un-anchor at the current location. Then, in block 1416 (also "YES" path of block 1408), the application causes the pipe AV to proceed along the route towards the second location. Then the application ends.

Thus, a computer implemented method, system or apparatus, and computer program product are provided in the illustrative embodiments for route modification and recharging for autonomous in-pipe vehicles and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
charging a rechargeable power source in an autonomous vehicle (AV) adapted to traverse within a pipe network, the charging using mechanical power derived from a flow of material within the pipe network;
powering a sensor in the AV from the charged rechargeable power source; and
causing, using power from the rechargeable power source, the AV to traverse within the pipe network;
monitoring, using the sensor, an environmental condition within the pipe network;
correlating, based on the monitoring, a portion of the pipe network with a previously determined map of the portion of the pipe network; and
updating, based on a result of the correlating, the map of the portion of the pipe network.

2. The method of claim 1, further comprising:
predicting, based on the monitoring, a future condition within the pipe network.

3. The method of claim 1, further comprising:
determining, based on the monitoring, that a second environmental condition at a location within the pipe network is suitable for charging the AV; and
charging, using the flow of material within the pipe network, the AV at the location.

4. The method of claim 3, further comprising:
affixing the AV to a second portion of the pipe network at the location prior to the charging; and
removing the AV from the fixation to the second portion after the charging.

5. The method of claim 3, further comprising:
predicting, based on the monitoring, a third environmental condition at a second location within the pipe network;
evaluating, based on the monitoring, a suitability of the third environmental condition at the second location for recharging the AV, the second location within a mapped portion of the pipe network, the second location reachable from a current location of the AV; and
recharging, using the flow of material within the pipe network responsive to the suitability evaluation, the AV at the second location.

6. The method of claim 1, further comprising:
reporting, during the traversing, the monitored environmental condition.

7. The method of claim 1, further comprising:
cleaning, during the traversing, a third portion of the pipe network.

8. The method of claim 1, further comprising:
collecting, during the traversing, a physical sample from a fourth portion of the pipe network.

9. A computer usable program product comprising one or more computer-readable storage devices, and program instructions stored on at least one of the one or more storage devices, the stored program instructions comprising:
program instructions to charge a rechargeable power source in an autonomous vehicle (AV) adapted to traverse within a pipe network, the charging using mechanical power derived from a flow of material within the pipe network;
program instructions to power a sensor in the AV from the charged rechargeable power source; and
program instructions to cause using power from the rechargeable power source, the AV to traverse within the pipe network;
program instructions to monitor, using the sensor, an environmental condition within the pipe network;
program instructions to correlate, based on the monitoring, a portion of the pipe network with a previously determined map of the portion of the pipe network; and
program instructions to updating, based on a result of the correlating, the map of the portion of the pipe network.

10. The computer usable program product of claim 9, further comprising:
program instructions to predict, based on the monitoring, a future condition within the pipe network.

11. The computer usable program product of claim 9, further comprising:
program instructions to determine, based on the monitoring, that a second environmental condition at a location within the pipe network is suitable for charging the AV; and
program instructions to charge, using the flow of material within the pipe network, the AV at the location.

12. The computer usable program product of claim 11, further comprising:
program instructions to affix the AV to a second portion of the pipe network at the location prior to the charging; and
program instructions to remove the AV from the fixation to the second portion after the charging.

13. The computer usable program product of claim 11, further comprising:
program instructions to predict, based on the monitoring, a third environmental condition at a second location within the pipe network;
program instructions to evaluate, based on the monitoring, a suitability of the third environmental condition at the second location for recharging the AV, the second location within a mapped portion of the pipe network, the second location reachable from a current location of the AV; and
program instructions to recharge, using the flow of material within the pipe network responsive to the suitability evaluation, the AV at the second location.

14. The computer usable program product of claim 9, further comprising:
   program instructions to report, during the traversing, the monitored environmental condition.

15. The computer usable program product of claim 9, further comprising:
   program instructions to clean, during the traversing, a third portion of the pipe network.

16. The computer usable program product of claim 9, wherein the computer usable code is stored in a computer readable storage device in a data processing system, and wherein the computer usable code is transferred over a network from a remote data processing system.

17. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
   program instructions to charge a rechargeable power source in an autonomous vehicle (AV) adapted to traverse within a pipe network, the charging using mechanical power derived from a flow of material within the pipe network;
   program instructions to power a sensor in the AV from the charged rechargeable power source; and
   program instructions to cause using power from the rechargeable power source, the AV to traverse within the pipe network;
   program instructions to monitor, using the sensor, an environmental condition within the pipe network;
   program instructions to correlate, based on the monitoring, a portion of the pipe network with a previously determined map of the portion of the pipe network; and
   program instructions to updating, based on a result of the correlating, the map of the portion of the pipe network.

\* \* \* \* \*